United States Patent
Chen et al.

(10) Patent No.: US 8,489,814 B2
(45) Date of Patent: Jul. 16, 2013

(54) CACHE CONTROLLER, METHOD FOR CONTROLLING THE CACHE CONTROLLER, AND COMPUTING SYSTEM COMPRISING THE SAME

(75) Inventors: Po-Hung Chen, Taipei (TW); Chang-Hsien Tai, Taipei (TW)

(73) Assignee: Mediatek, Inc., Hsinchu (TW)

( * ) Notice: Subject to any disclaimer, the term of this patent is extended or adjusted under 35 U.S.C. 154(b) by 974 days.

(21) Appl. No.: 12/489,795

(22) Filed: Jun. 23, 2009

(65) Prior Publication Data

US 2010/0325364 A1    Dec. 23, 2010

(51) Int. Cl.
*G06F 12/00*    (2006.01)
*G06F 13/00*    (2006.01)

(52) U.S. Cl.
USPC ........... 711/118; 711/100; 711/131; 711/149; 711/154

(58) Field of Classification Search
USPC ................. 711/118, 100, 117, 131, 149, 154
See application file for complete search history.

(56) References Cited

U.S. PATENT DOCUMENTS

| | | | |
|---|---|---|---|
| 6,748,558 B1 * | 6/2004 | Gonzales et al. | 714/47.1 |
| 2007/0083711 A1 * | 4/2007 | Bradford et al. | 711/118 |
| 2008/0016282 A1 * | 1/2008 | Sakamoto | 711/131 |

* cited by examiner

*Primary Examiner* — Tuan V. Thai
(74) *Attorney, Agent, or Firm* — Grossman, Tucker, Perreault & Pfleger, PLLC

(57) ABSTRACT

A cache controller, a method for controlling the cache controller, and a computing system comprising the same are provided. The computer system comprises a processor and a cache controller. The cache controller is electrically connected to the processor and comprises a first port, a second port, and at least one cache. The first port is configured to receive an address of a content, wherein a type of the content is one of instruction and data. The second port is configured to receive an information bit corresponding to the content, wherein the information bit indicates the type of the content. The at least one cache comprises at least one cache lines. Each of the cache lines comprises a content field and corresponding to an information field. The content and the information bit is stored in the content field of one of the cache lines and the corresponding information field respectively according to the information bit and the address. Thereby, instruction and data are separated in a unified cache.

28 Claims, 4 Drawing Sheets

CACHE CONTROLLER, METHOD FOR CONTROLLING THE CACHE CONTROLLER, AND COMPUTING SYSTEM COMPRISING THE SAME

CROSS-REFERENCES TO RELATED APPLICATIONS

Not applicable.

BACKGROUND OF THE INVENTION

1. Field of the Invention

The present invention relates to a cache controller, a method for controlling the cache controller, and a computing system comprising the same. More particularly, the present invention relates to a cache controller, a method for controlling the cache controller, and a computing system that separate instruction and data in a unified cache.

2. Descriptions of the Related Art

Cache plays an important role in the modern CPU design. A cache is used to store a small portion of content that are frequently accessed and reused by a CPU. If the stored content have temporal and spatial locality, a cache can be efficiently accessed. Content to be stored in cache comprises instructions and data. Most instructions have locality between each other and most data have locality between each other; however there is no locality between an instruction and data.

Caches can be generally classified into unified caches and non-unified caches. In a non-unified cache, instructions and data are dealt separately. Specifically, a non-unified cache stores instructions and data in different hardware and has two ports for transmitting instructions and data individually. Since instructions and data are dealt separately, it is easy to maintain the locality between the instructions stored in the cache and the locality between the data stored in the cache.

On the contrary, a unified cache stores instruction and data in same hardware and uses a single port for transmitting both instructions and data. FIG. 1 illustrates a schematic view of a conventional computer system 1 using a unified cache. The computer system 1 comprises a processor 11, a unified cache controller 13, and a memory module 15. Moreover, the unified cache controller 13 comprises a cache 131.

The unified cache controller 13 is connected to the processor 11 via a first port 130, a second port 132, and a third port 134. The first port is configured to receive an address of a content from the processor 11, wherein the content may be instructions or data. The second port 132 is a dummy port in the conventional unified cache controller 13. The third port 134 is configured to transmit content of the cache controller 13 to the processor. Apparently, data and instructions are mixed in the cache 131 and the cache controller 13 has no way to manage the content stored in the cache 131. Specifically, when the cache lines are full, the cache controller 23 just flushes one or more cache lines without regarding the content stored in the flushed cache lines. Therefore, it is possible that the cache controller 23 flushes an instruction or data that will be used in the next cycle, which will increase the probability of cache miss.

Unified caches are popular in the modern CPU design because they can be designed and expanded easily. Therefore, it is urgent to find an approach for the unified cache to solve the problem of high cache miss causing by the competition of instructions and data.

SUMMARY OF THE INVENTION

An objective of this invention is to provide a cache controller. The cache controller comprises a first port, a second port, and at least one cache. The first port is configured to receive an address of a content from a processor, wherein a type of the content is one of instruction and data. The second port is configured to receive an information bit corresponding to the content from the processor, wherein the information bit indicates the type of the content. The at least one cache comprises a plurality of cache lines. Each of the cache lines comprises a content field and corresponding to an information field. The content and the information bit are respectively stored in the content field of one of the cache lines and the corresponding information field according to the information bit and the address.

Another objective of this invention is to provide a method for controlling a cache controller. The cache controller comprises at least one cache. Each of the at least one cache comprises a plurality of cache lines, and each of the cache lines comprises a content field and corresponding to an information field. The method comprises the steps of (a) receiving an address of a content from a processor, a type of the content being one of instruction and data; (b) receiving an information bit corresponding to the content from the processor, the information bit indicating the type of the content; and (c) storing the content and the information bit in the content field of one of the cache lines and the corresponding information field respectively according to the information bit and the address.

Yet a further objective of this invention is to provide a computing system. The computing system comprises a processor and a cache controller. The cache controller electrically connected to the processor. The cache controller comprises a first port, a second port, and at least one cache. The first port is configured to receive an address of a content from the processor, wherein a type of the content is one of instruction and data. The second port is configured to receive an information bit corresponding to the content from the processor, and the information bit indicates the type of the content. The at least one cache comprises a plurality of cache lines. Each of the cache lines comprises a content field and corresponding to an information field. The content and the information bit are respectively stored in the content field of one of the cache lines and the corresponding information field according to the information bit.

The present invention separates instruction and data in a unified cache. The reason of this arrangement is that data themselves have locality and instructions themselves have locality; however, there is no locality between an instruction and data. With the arrangements, the hit rate of the unified cache can be increased and processing time can be reduced.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, this invention will be explained with reference to embodiments thereof. However, these embodiments are not intended to limit this invention to any specific environment, applications, or particular implementations described in these embodiments. Therefore, description of these embodiments is only provided for purpose of illustration but not to limit this invention. It should be appreciated that, in the following embodiments and the attached drawings, elements not related directly to this invention are omitted from depiction.

Figure 1:
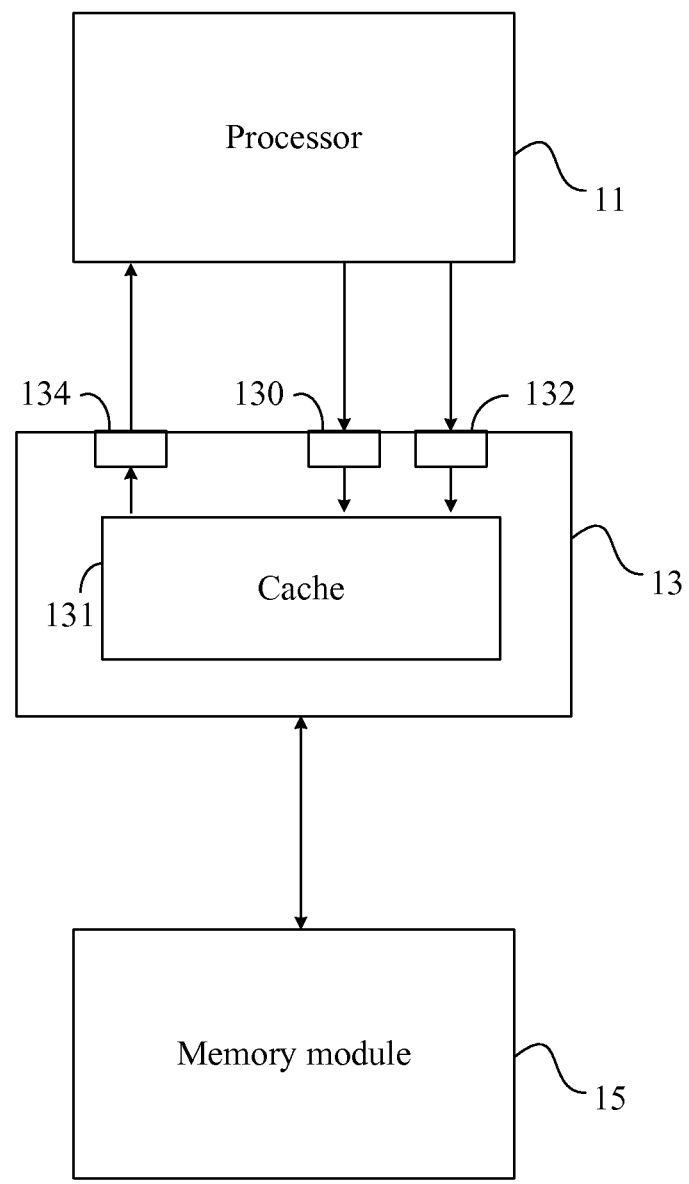
FIG. 1 illustrates a conventional computer system using a unified cache controller.
Figure 2:
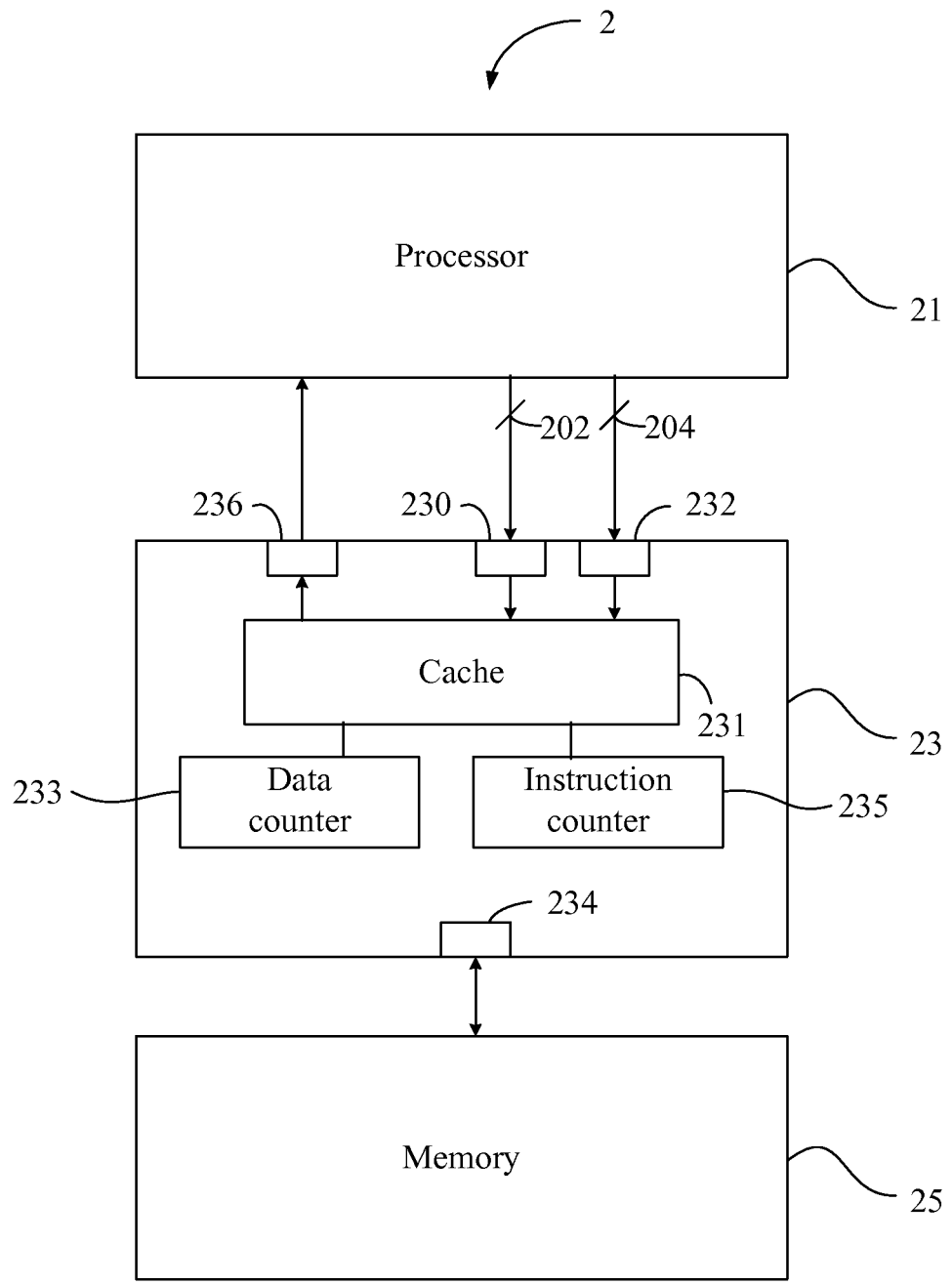
FIG. 2 illustrates a first embodiment of the present invention.

FIG. 2 illustrates a first embodiment of the invention, which is a computer system 2. The computing system 2 comprises a processor 21, a cache controller 23, and a memory module 25.

The processor 21 is a processor that has one single port for receiving content from the cache controller 23, such as an ARM7EJS processor. The memory 25 can be a DRAM, an SRAM, or any storage medium. In this embodiment, a type of the content may be an instruction or data. The cache controller 23 comprises a cache 231, a data counter 233, and an instruction counter 235. It is noted that a cache controller can have a plurality of caches in other embodiments. The number of caches of the cache controller does not limit the scope of the present invention. The cache controller 23 further comprises a first port 230, a second port 232, a third port 234, and a fourth port 236, wherein the first port 230, the second port 232, and the fourth port 236 are electrically connected to the processor 21 and the third port 234 is electrically connected to the memory 25.

Figure 3A:
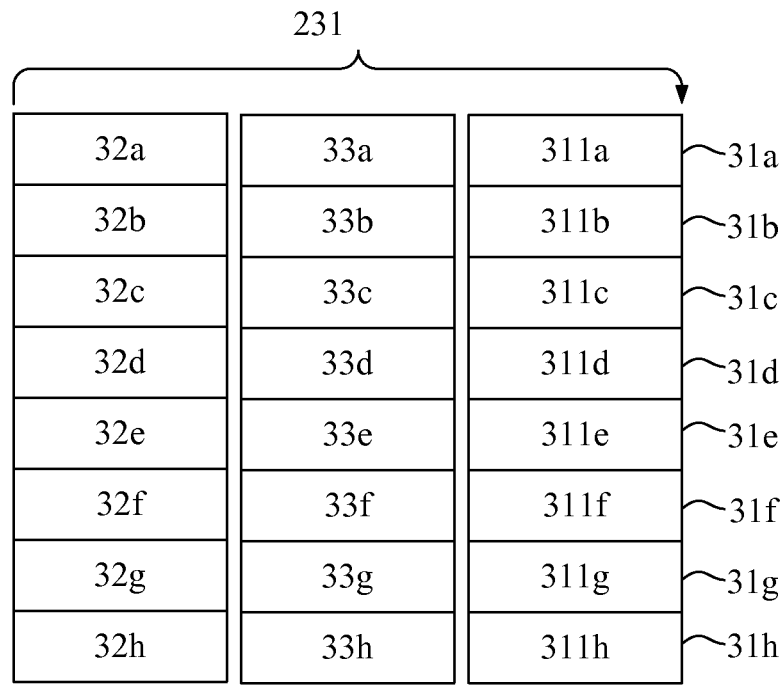
FIG. 3A illustrates a schematic diagram of the cache in the first embodiment.

Please refer to FIG. 3A for a schematic diagram of the cache 231. The cache 231 comprises a plurality of cache lines 31a, 31b, 31c, 31d, 31e, 31f, 31g, 31h, a plurality of information fields 32a, 32b, 32c, 32d, 32e, 32f, 32g, 32h, and a plurality of tag fields 33a, 33b, 33c, 33d, 33e, 33f, 33g, 33h. Each of the information fields 32a, 32b, 32c, 32d, 32e, 32f, 32g, 32h may be realized by a one-bit register, while each of the tag fields 33a, 33b, 33c, 33d, 33e, 33f, 33g, 33h may be realized by a multi-bit register. It is noted that the numbers of the cache lines, the information fields, and the tag fields do not limit the scope of this invention. The cache lines 31a, 31b, 31c, 31d, 31e, 31f, 31g, 31h respectively correspond to the information field 32a, 32b, 32c, 32d, 32e, 32f, 32g and the tag fields 33a, 33b, 33c, 33d, 33e, 33f, 33g, 33h.

The processor 21 has to fetch content from the cache 231 to function. Specifically, the processor 21 transmits an address 202 of a content and an information bit 204 corresponding to the content to the cache controller 23. Then, the first port 230 and second port 232 of the cache controller 23 respectively receives the address 202 of the content and the information bit 204 corresponding to the content. The information bit 204 indicates the type of the content, such as "0" indicating instruction and "1" indicating data. It is noted that using "0" or "1" to represent instruction (or data) does not limit the scope of the present invention. When the content is an instruction, the address is an address of the instruction and the information bit is 0. Similarly, when the content is data, the address is an address of data and the information bit is 1.

Figure 3B:
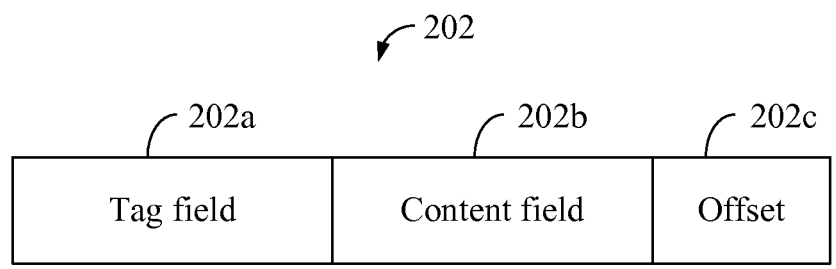
FIG. 3B illustrates a schematic diagram of the address of the present invention.

After receiving the address 202 and the information bit 204, the cache controller 23 looks the cache 231 for the correct content according to the address 202, which results in either cache hit or cache miss. FIG. 3B illustrates a schematic diagram of the address 202, which comprises a tag field 202a, a content field 202b, and an offset 202c. The cache controller 23 compares the tag field 202a of the address 202 with the tag fields 33a, 33b, 33c, 33d, 33e, 33f, 33g, 33h of the cache 231. If one of the tag fields 33a, 33b, 33c, 33d, 33e, 33f, 33g, 33h of the cache 231 matches the tag field 202a of the address 202, then cache hit—otherwise it is cache miss.

The situation of "cache miss" is now described. The cache controller 23 requests and then receives the content stored at the address 202 from the memory 25. After that, the cache controller 23 stores the content in one of the cache lines 31a, 31b, 31c, 31d, 31e, 31f, 31g, 31h according to the information bit 204 and the address 202 and stores the information bit 204 in the information field corresponding to the cache line that stored the content. Then, the cache controller 23 transmits the content to the processor 21 via the fourth port 236. The following paragraphs describe the details of storing the content and the information bit 204.

The cache controller 23 set the value of the data counter 233 and the instruction counter 235 according to an adjusted ratio indicating the ratio of instructions to data. The adjusted ratio may be a built-in value or a value set by a user using the computer system 2. It is assumed that the adjusted ratio of instructions to data is 1:3. Based on the assumption, two of the 8 cache lines 31a, 31b, 31c, 31d, 31e, 31f, 31g, 31h can be used to store content whose type is instruction and the other six cache lines can be used to store content whose type is data. It is noted that 1:3 is used for illustration but not to limit the scope of the present invention.

The adjusted ratio is use to set a range for the instruction counter 235 and a range for the data counter 233. The instruction counter 235 is configured to store a number of the cache lines whose corresponding information field stores a bit indicating the type of instruction, while the data counter 233 is configured to store a number of the cache lines whose information field stores a bit indicating the type of data. Since two of the 8 cache lines 31a, 31b, 31c, 31d, 31e, 31f, 31g, 31h can be used to store content whose type is instruction, the range for the instruction counter 235 is from 0 to 2. Similarly, since six of the 8 cache lines 31a, 31b, 31c, 31d, 31e, 31f, 31g, 31h can be used to store content whose type is data, the range for the data counter 233 is from 0 to 6. For example, at the beginning all the 8 cache lines 31a, 31b, 31c, 31d, 31e, 31f, 31g, 31h are empty, so both the data counter 233 and the instruction counter 235 are set to zero.

If the information bit 204 indicates that the type of the content is instruction (e.g. the instruction bit 204 is 0), then the cache controller 23 determines whether the number of the instruction counter 235 reaches its maximum (i.e. 2). If the instruction counter 235 has not reached its maximum, the cache controller 23 selects an empty cache line from the 8 cache lines 31a, 31b, 31c, 31d, 31e, 31f, 31g, 31h to store the content. It is assumed that the cache line 31a is selected. Then, the cache controller 23 stores the content in the cache line 31a, stores the information bit 204 in the corresponding information field 32a, and stores the tag field 202a of the address 202 in the corresponding tag field 33a. After the storing of the content, the number stored in the instruction counter 235 is updated; specifically, the number of the instruction counter 235 is increased from 0 to 1.

It is possible that the instruction counter 235 has reached its maximum, then the cache controller 23 has to select at least one of the cache lines whose corresponding information field is 0 (i.e. indicating that the cache line store a content whose type is instruction) to perform flushing. The instruction counter 235 will be updated accordingly after flushing. Specifically, if the cache controller 23 flushes two cache lines whose corresponding information field is 0, the number of the instruction counter 235 is decrease by two. If the cache controller 23 flushes one cache line whose corresponding information field is 0, the number of the instruction counter 235 is decrease by one. It is emphasized that the cache controller 23 will not select cache lines whose corresponding filed is 1 to perform flushing when the information bit 204 is 0.

Similarly, if the information bit 204 indicates that the type of the content is data (i.e. the information bit 204 is 1), then the cache controller 23 determines whether the number of the data counter 233 reaches its maximum (i.e. 6). If the data counter 233 has not reached its maximum, the cache controller 23 stores the content, the information bit, and the tag field 202a of the address 202 in the similar approach and the data counter 233 is updated accordingly. Likewise, if the data counter 233 has reached its maximum, the cache controller 23 has to select at least one of the cache lines whose corresponding information field is 1 (i.e. indicating that the cache line store a content whose type is data) to perform flushing. The data counter 233 will be updated accordingly after flushing. Please note that using counter for data and instruction is only an exemplarity embodiment of the present invention. For example, the data counter or instruction counter can also be implemented by a software method by utilizing the similar steps as performed by data counter 233 and instruction counter 235.

In other embodiments, the cache controller 23 may use the instruction counter 235 and the data counter 233 in the decreasing fashion. That is, the data counter 233 is configured to store a number indicating the cache lines that still can be stored content whose type is data, while the instruction counter 235 is configured to store a number indicating the cache lines that still can be stored content whose type is instruction. In that case, the instruction counter 235 and the data counter 233 are individually set to their maximums at the beginning. When the cache controller 23 stores a content whose type is instruction in one of the cache lines 31a, 31b, 31c, 31d, 31e, 31f, 31g, 31h, the cache controller 23 decreases the instruction counter 235 by one. Similarly, when the cache controller 23 stores a content whose type is data in one of the cache lines 31a, 31b, 31c, 31d, 31e, 31f, 31g, 31h, the cache controller 23 decreases the data counter 233 by one.

According to the aforementioned description, people skilled in the art can realized the idea of the present invention to a cache controller comprising a plurality of cache lines.

With the assistance of an information bit from the processor 21, the data counter 233, and the instruction counter 235, the present invention can separate instruction and data in the cache 231. It is emphasized that the cache 231 is a unified cache. When the cache lines for storing instructions are full, the cache controller 23 only flushes cache lines for instructions and will not flush cache lines for data. Similarly, when the cache lines for storing data are full, the cache controller 23 only flushes cache lines for data and will not flush cache lines for instructions. The reason of this arrangement is that data themselves have locality and instructions themselves have locality; however, there is no locality between an instruction and data. With the aforementioned arrangement, the hit rate of the unified cache can be increased.

Figure 4:
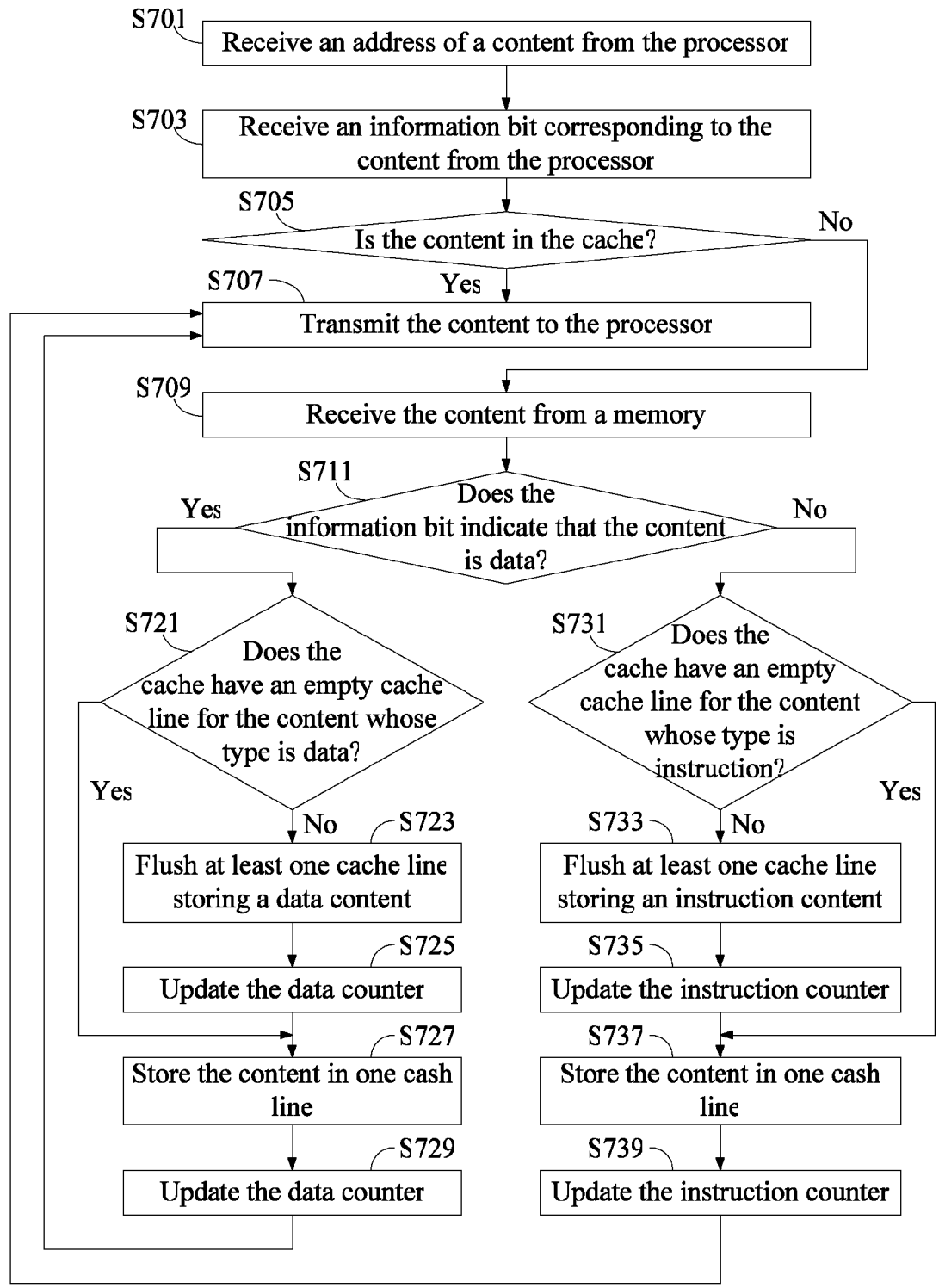
FIG. 4 illustrates an embodiment of a method for controlling a cache controller.

FIG. 4 illustrates a flow chart of a method for controlling a cache controller of the present invention. The method can be used by a unified cache like the cache controller 23 in the first embodiment. The explanation of the method will be described with reference to the cache controller 23. In addition, the data counter 233 and the instruction counter 235 are individually set to their maximums at the beginning. For example, the data counter 233 is set to six and the instruction counter 235 is set to two. It means that there are still six empty cache lines and two empty cache lines for content whose type is data and instruction, respectively.

First, the method executes step S701 so that the cache controller 23 receives an address of a content from a processor, wherein a type of the content may be instruction or data. In step S703, the cache controller 23 receives an information bit corresponding to the content from the processor, wherein the information bit indicates the type of the content. It is noted that the cache controller 23 can execute the steps S701 and S703 simultaneously or executes the step S703 before the step S701.

Next, step S705 is executed to enable the cache controller 23 to determine whether the content indicated by the address is in the cache. If the content is in the cache, the cache controller 23 executes step S707 to transmit the content to the processor. If the content is not in the cache, the cache controller 23 executes step S709 to receive the content from a memory according to the address.

After the step S709, the cache controller 23 executes step S711 to determine whether the information bit indicates the type of the content is data. If the type of the content is data, then steps S721, S723, S725, S727, S729, and S707 are executed. If the type of the content is not data (i.e. the type is instruction), then steps S731, S733, S735, S737, S739, and S707 are executed.

If the type of the content is data, the cache controller 23 executes step 721 to determine whether the cache still has an empty cache line for the content whose type is data. Specifically, step 721 is realized by determining whether the number stored in the data counter is not zero. If the cache still has an empty cache line for the content whose type is data (i.e. the data counter is not zero), then the cache controller 23 executes step S727 to store the content in one of the empty cache lines. Next, the cache controller 23 executes step S729 to update the data counter. Specifically, the cache controller 23 updates the data counter by decreasing the data counter by one. After that, the cache controller 23 executes step 707 to transmit the content to the processor. On the other hand, if step S721 determines that the cache does not have an empty cache line for the content whose type is data, the cache controller 23 has to execute steps S723 and S725 before the step S727. In step S723, the cache controller 23 flushes at least one cache line storing a content whose type is data. That is, the cache controller 23 flushes the content field of one of the cache lines whose corresponding information field stores a bit indicating the type of data, and flushes the corresponding information field as well. After flushing, the cache controller 23 executes step S725 to update the data counter. Specifically, the cache controller 23 updates the data counter by increasing the data counter by one.

If step S711 determines that the type of the content is instruction (i.e. not data), the cache controller 23 executes step 731 to determine whether the cache still has an empty cache line for the content whose type is instruction. Specifically, the cache controller 23 can determine whether the number stored in the instruction counter is zero in step S731. If the cache still has an empty cache line for the content whose type is instruction (i.e. the instruction counter is not zero), then the cache controller 23 executes step S737 to store the content in one of the empty cache lines. Next, the cache controller 23 executes step S739 to update the instruction counter. Specifically, the cache controller 23 updates the instruction counter by decreasing the instruction counter by one in step S739. After that, the cache controller 23 executes step 707 to transmit the content to the processor. If step S731 determines that the cache does not have an empty cache line for the content whose type is instruction, the cache controller 23 has to execute steps S733 and S735 before the step S737. In step S733, the cache controller 23 flushes at least one cache line storing a content whose type is instruction. That is, the cache controller 23 flushes the content field of one of the cache lines whose corresponding information field stores a bit indicating the type of instruction, and flushes the corresponding information field as well. After flushing, the cache controller 23 executes step S735 to update the data counter. Specifically, the cache controller 23 updates the data counter by increasing the number stored in the instruction counter by one in step S735.

It is noted that the cache controller 23 may flushes more than one cache lines in steps S723 and S733. For those situations, steps S725 and S735 are updated according to the number of the flushed cache lines.

Moreover, in other embodiment the method may choose another approach to realize the steps S721, S725, S729, S731, S735, and S739. For example, the data counter and the instruction counter may be set to zero at the beginning. In this case, the cache controller 23 determines whether the data counter reaches its maximum at step S721, determines whether the instruction counter reaches its maximum at step S731, decreases the data counter by one in step S725, decreases the instruction counter by one in step S735, increases the data counter by one in step S729, and increases the instruction counter by one in step S739.

In addition to the aforementioned steps, the methods in which the flow diagram executes these operations and functions will be readily appreciated by those of ordinary skill in the art based on the explanation of the first second embodiment, and thus will not be further described herein.

According to the aforementioned steps, the method of the present invention separate instruction and data in a unified cache. When the cache lines for storing instructions are full, the cache controller 23 only flushes cache lines for instructions and will not flush cache lines for data. Similarly, when the cache lines for storing data are full, the cache controller 23 only flushes cache lines for data and will not flush cache lines for instructions. By doing so, the hit rate of the unified cache can be increased and the processing time is decreased.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A cache controller, comprising:
    a first port being configured to receive an address of a content from a processor, a type of the content being one of instruction and data;
    a second port being configured to receive an information bit corresponding to the content from the processor, the information bit indicating the type of the content; and
    at least one unified cache, comprising a plurality of cache lines, each of the cache lines comprising a content field and corresponding to an information field, and the content and the information bit being respectively stored in the content field of one of the cache lines and the corresponding information field according to the information bit and the address.

2. The cache controller as claimed in claim 1, further comprising:
    a third port being configured to receive the content from a memory according to the address before storing the content in one of the cache lines.

3. The cache controller as claimed in claim 1, further comprising:
    a fourth port being configured to transmit the content to the processor.

4. The cache controller as claimed in claim 1, further comprising:
    a data counter being configured to store a number related to the cache lines whose corresponding information field stores a bit indicating the type of data.

5. The cache controller as claimed in claim 4, wherein the information bit indicates the type of the content being data, and the number stored in the data counter is updated according to the storing of the content.

6. The cache controller as claimed in claim 1, further comprising:
    a data counter being configured to store a number indicating the cache lines that still can be stored content whose type is data.

7. The cache controller as claimed in claim 6, wherein the information bit indicates the type of the content being data, and the number stored in the data counter is decreased by one according to the storing of the content.

8. The cache controller as claimed in claim 1, further comprising:
    an instruction counter being configured to store a number related to the cache lines whose corresponding information field stores a bit indicating the type of instruction.

9. The cache controller as claimed in claim 8, wherein the information bit indicates the type of the content being instruction, and the number stored in the instruction counter is updated according to the storing of the content.

10. The cache controller as claimed in claim 1, further comprising:
    an instruction counter being configured to store a number indicating the cache lines that still can be stored content whose type is instruction.

11. The cache controller as claimed in claim 10, wherein the information bit indicates the type of the content being instruction, and the number stored in the instruction counter is decreased by one according to the storing of the content.

12. A method for controlling a cache controller, the cache controller comprising a first port, a second port, and at least one unified cache, each of the at least one unified cache comprising a plurality of cache lines, each of the cache lines comprising a content field and corresponding to an information field, the method comprising the steps of:
    receiving an address of a content from a processor via the first port, a type of the content being one of instruction and data;
    receiving an information bit corresponding to the content from the processor via the second port, the information bit indicating the type of the content; and
    storing the content and the information bit in the content field of one of the cache lines and the corresponding information field respectively according to the information bit and the address.

13. The method as claimed in claim 12, further comprising a step of receiving the content from a memory according to the address before the storing step.

14. The method as claimed in claim 12, further comprising a step of transmitting the content to the processor.

15. The method as claimed in claim 12, wherein the cache controller further comprises a data counter being configured to store a number related to the cache lines whose corresponding information field stores a bit indicating the type of data, the information bit indicates the type of the content being data, and the method further comprises a step of updating the data counter of the cache controller according to the storing step.

16. The method as claimed in claim 12, wherein the cache controller further comprises a data counter being configured to store a number indicating the cache lines that still can be stored content whose type is data, the information bit indicates the type of the content being data, and the method further comprises the step of:
   decreasing the number stored in the data counter of the cache controller by one according to the storing step.

17. The method as claimed in claim 16, further comprising the following steps before the storing step:
   determining that the type indicated by the information bit is data;
   determining that the number stored in the data counter is zero;
   flushing the content field of one of the cache lines whose corresponding information field stores a bit indicating the type of data;
   flushing the corresponding information field; and
   increasing the number stored in the data counter by one.

18. The method as claimed in claim 12, wherein the cache controller further comprises an instruction counter being configured to store a number related to the cache lines whose corresponding information field stores a bit indicating the type of instruction, the information bit indicates the type of the content being instruction, and the method further comprises a step of updating the instruction counter of the cache controller according to the storing step.

19. The method as claimed in claim 12, wherein the cache controller further comprises an instruction counter being configured to store a number indicating the cache lines that still can be stored content whose type is instruction, the information bit indicates the type of the content being instruction, and the method further comprises the step of:
   decreasing the number stored in the instruction counter of the cache controller by one according to the storing step.

20. The method as claimed in claim 19, further comprising the following steps before the storing step:
   determining that the type indicated by the information bit is instruction;
   determining that the number stored in the instruction counter is zero;
   flushing the content field of one of the cache lines whose corresponding information field stores a bit indicating the type of instruction;
   flushing the corresponding information field; and
   increasing the number stored in the instruction counter by one.

21. A computing system, comprising:
   a processor; and
   a cache controller electrically connected to the processor, comprising:
      a first port being configured to receive an address of a content from the processor, a type of the content being one of instruction and data;
      a second port being configured to receive an information bit corresponding to the content from the processor, the information bit indicating the type of the content; and
   at least one unified cache, comprising a plurality of cache lines, each of the cache lines comprising a content field and corresponding to an information field, and the content and the information bit being respectively stored in the content field of one of the cache lines and the corresponding information field according to the information bit and the address.

22. The computing system as claimed in claim 21, wherein the information bit indicates the type of the content being data, and the cache controller further comprises:
   a data counter being configured to store a number related to the cache lines whose corresponding information field stores a bit indicating the type of data;
      wherein the number is updated according to the storing of the content.

23. The computing system as claimed in claim 21, wherein the information bit indicates the type of the content being data, and the cache controller further comprises:
   a data counter being configured to store a number indicating the cache lines that still can be stored content whose type is data;
      wherein the number is decreased by one according to the storing of the content.

24. The computing system as claimed in claim 21, wherein the information bit indicates the type of the content being instruction, and the cache controller further comprises:
   an instruction counter being configured to store a number related to the cache lines whose corresponding information field storing a bit indicating the type of instruction;
      wherein the number is updated according to the storing of the content.

25. The computing system as claimed in claim 21, wherein the information bit indicates the type of the content being instruction, and the cache controller further comprises:
   an instruction counter being configured to store a number indicating the cache lines that still can be stored content whose type is instruction;
      wherein the number is decreased by one according to the storing of the content.

26. The computing system as claimed in claim 21, wherein the processor is an ARM7EJS processor.

27. The computing system as claimed in claim 21, further comprising:
   a memory;
      wherein the cache controller further comprises a third port being configured to receive a content from the memory according to the address before storing the content in one of the cache lines.

28. The computing system as claimed in claim 21, wherein the cache controller further comprises:
   a third port being configured to transmit the content to the processor.

* * * * *